United States Patent
Liu et al.

(10) Patent No.: US 7,492,382 B2
(45) Date of Patent: Feb. 17, 2009

(54) VOLTAGE ADJUSTING SYSTEM AND METHOD FOR ADJUSTING DRIVING VOLTAGE OF THERMAL PRINT HEAD

(75) Inventors: Kai-Hsiang Liu, Miaoli County (TW); Chia-Fu Chen, Hsinchu (TW)

(73) Assignee: Lite-On Technology Corp., Neihu, Taipei (TW)

( * ) Notice: Subject to any disclaimer, the term of this patent is extended or adjusted under 35 U.S.C. 154(b) by 162 days.

(21) Appl. No.: 11/740,263

(22) Filed: Apr. 25, 2007

(65) Prior Publication Data
US 2008/0150509 A1    Jun. 26, 2008

(30) Foreign Application Priority Data
Dec. 21, 2006    (TW) ............... 95148267 A

(51) Int. Cl.
*B41J 2/35* (2006.01)
(52) U.S. Cl. ............... 347/211
(58) Field of Classification Search ......... 347/211, 347/188; 346/76.1; 219/482, 489, 490, 497
See application file for complete search history.

(56) References Cited

U.S. PATENT DOCUMENTS

| 4,573,058 A | | 2/1986 | Brooks |
| 5,073,786 A | * | 12/1991 | Shimada et al. ............. 347/211 |
| 5,121,135 A | | 6/1992 | Deguchi et al. |

* cited by examiner

*Primary Examiner*—K. Feggins
(74) *Attorney, Agent, or Firm*—Winston Hsu

(57) ABSTRACT

The present invention discloses a voltage adjusting system and method for adjusting a driving voltage of a thermal print head by utilizing an electronic variable resistor. The voltage adjusting system includes a power converter, a voltage divider, an analog-to-digital converter (ADC), and a controller. The system and method of the present invention obtains a detecting voltage value through a feedback mechanism and the ADC, and then utilizes the detecting voltage value to control the electronic variable resistor implemented in the voltage divider to adjust the driving voltage of the thermal print head.

9 Claims, 4 Drawing Sheets

VOLTAGE ADJUSTING SYSTEM AND METHOD FOR ADJUSTING DRIVING VOLTAGE OF THERMAL PRINT HEAD

BACKGROUND OF THE INVENTION

1. Field of the Invention

The invention relates to a voltage adjusting system and method thereof, and more particularly, to a voltage adjusting system and method thereof for adjusting a driving voltage of a thermal print head (TPH).

2. Description of the Prior Art

A printing color concentration of a thermal sublimation (or thermal transfer) printer is determined by a power and printing time of a thermal print head (TPH). In other words, it is necessary to let the TPH have the same power during a printing time if the printing color concentration of the thermal sublimation printer is required to be controlled stably.

In general, the power of the TPH during the printing operation is determined by a resistance value of the TPH and an input driving voltage. Since the resistance value of the TPH has a +/−10% error range when the TPH is manufactured, the driving voltage of the TPH has to be adjusted to fit the different mean resistance values of the TPH in order to let every TPH have the same power during the printing operation.

In a conventional thermal sublimation printer, a DC-to-DC power converter and a voltage divider are coupled to a power input terminal of the TPH in order to adjust the driving voltage of the TPH, so as to enable the driving voltage of the TPH to be changed by adjusting the resistance of the voltage divider, and thereby ensure every TPH has the same or similar power during the printing operation.

The prior art utilizes a mechanical variable resistor coupled to a voltage feedback loop of the DC-to-DC power converter in order to adjust the driving voltage of the TPH. Please refer to FIG. 1. FIG. 1 shows a simplified block diagram of a voltage adjusting system 100 for adjusting the driving voltage of the TPH according to the prior art. As shown in FIG. 1, the voltage adjusting system 100 for adjusting the driving voltage of a TPH 10 includes a power converter 102 and a voltage divider 104, and the power converter 102 is coupled to a power supply 106, wherein the voltage divider 104 includes a first resistor R1, a second resistor R2, and a mechanical variable resistor VR1.

The conventional design mentioned above is only capable of adjusting the resistance of the mechanical variable resistor by hand. This means that not only is it easy to generate errors due to the adjustments being done by hand, but the production rate of the product in the production line is also reduced, and the cost of labor power is increased. In addition, if the resistance of the mechanical variable resistor is shifted from an ideal resistance due to the component aging or vibration, then the driving voltage of the TPH will be shifted accordingly. In other words, the printing color concentration of the thermal sublimation printer will be affected and result in bad printing image quality.

Other prior arts utilize a voltage regulator to control the driving voltage of the TPH, such as U.S. Pat. Nos. 4,573,058 and 5,121,135. However, both of these conventional designs have the disadvantage of high cost, and the effect of these two conventional designs is not sufficiently good.

SUMMARY OF THE INVENTION

It is therefore one of the objectives of the present invention to provide a voltage adjusting system and method for adjusting a driving voltage of a thermal print head (TPH) by utilizing an electronic variable resistor to solve the above problems.

According to an embodiment of the present invention, a voltage adjusting system for adjusting a driving voltage of a TPH is disclosed. The voltage adjusting system comprises a power converter, a voltage divider, an analog-to-digital converter (ADC), and a controller. The power converter is coupled to a supply voltage, and utilized for converting the supply voltage to the driving voltage according to a feedback voltage. The voltage divider is coupled to the power converter, and utilized for generating the feedback voltage according to the driving voltage. The voltage divider comprises a first resistive component and a second resistive component, wherein at least a target resistive component of the first resistive component and the second resistive component comprises an electronic variable resistor. The ADC is coupled to the power converter, and utilized for generating a detecting voltage value according to the driving voltage. The controller is coupled to the ADC and the electronic variable resistor, and utilized for controlling the electronic variable resistor to adjust a resistance value of the target resistive component according to the detecting voltage value and a target voltage value.

According to another embodiment of the present invention, a voltage adjusting system is further disclosed. The voltage adjusting system comprises a power converter, a voltage divider, an ADC, and a controller. The power converter is coupled to a supply voltage, and utilized for converting the supply voltage to an output voltage according to a feedback voltage. The voltage divider is coupled to the power converter, and utilized for generating the feedback voltage according to the output voltage. The voltage divider comprises a first resistive component and a second resistive component, wherein at least a target resistive component of the first resistive component and the second resistive component comprises an electronic variable resistor. The ADC is coupled to the power converter, and utilized for generating a detecting voltage value according to the output voltage. The controller is coupled to the ADC and the electronic variable resistor, and utilized for controlling the electronic variable resistor to adjust a resistance value of the target resistive component according to the detecting voltage value and a target voltage value.

According to yet another embodiment of the present invention, a method for adjusting a driving voltage of a TPH is further disclosed. The method comprises: converting a supply voltage to the driving voltage according to a feedback voltage; utilizing a voltage divider to generate the feedback voltage according to the driving voltage, the voltage divider comprising a first resistive component and a second resistive component, wherein at least a target resistive component of the first resistive component and the second resistive component comprises an electronic variable resistor; performing an analog-to-digital converting operation on the driving voltage to generate a detecting voltage value; and controlling the electronic variable resistor to adjust a resistance value of the target resistive component according to the detecting voltage value and a target voltage value.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular components. As one skilled in the art will appreciate, hardware manufacturers may refer to a component by different names. This document does not intend to distinguish between components that differ in name but in function. In the following discussion and in the claims, the terms "include", "including", "comprise", and "comprising" are used in an open-ended fashion, and thus should be interpreted to mean "including, but not limited to . . . ". The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
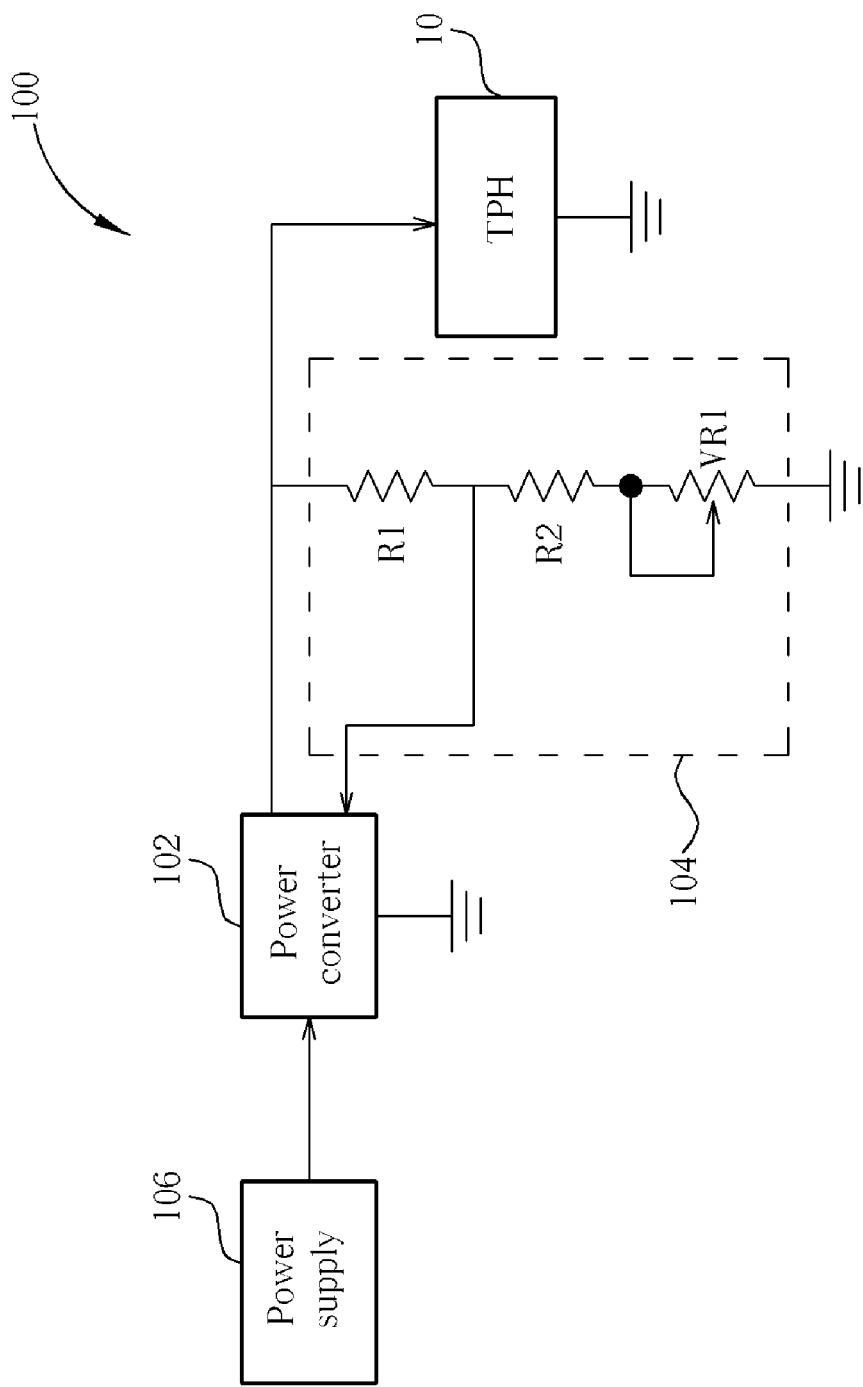
FIG. 1 shows a simplified block diagram of a voltage adjusting system for adjusting a driving voltage of a TPH according to the prior art.
Figure 2:
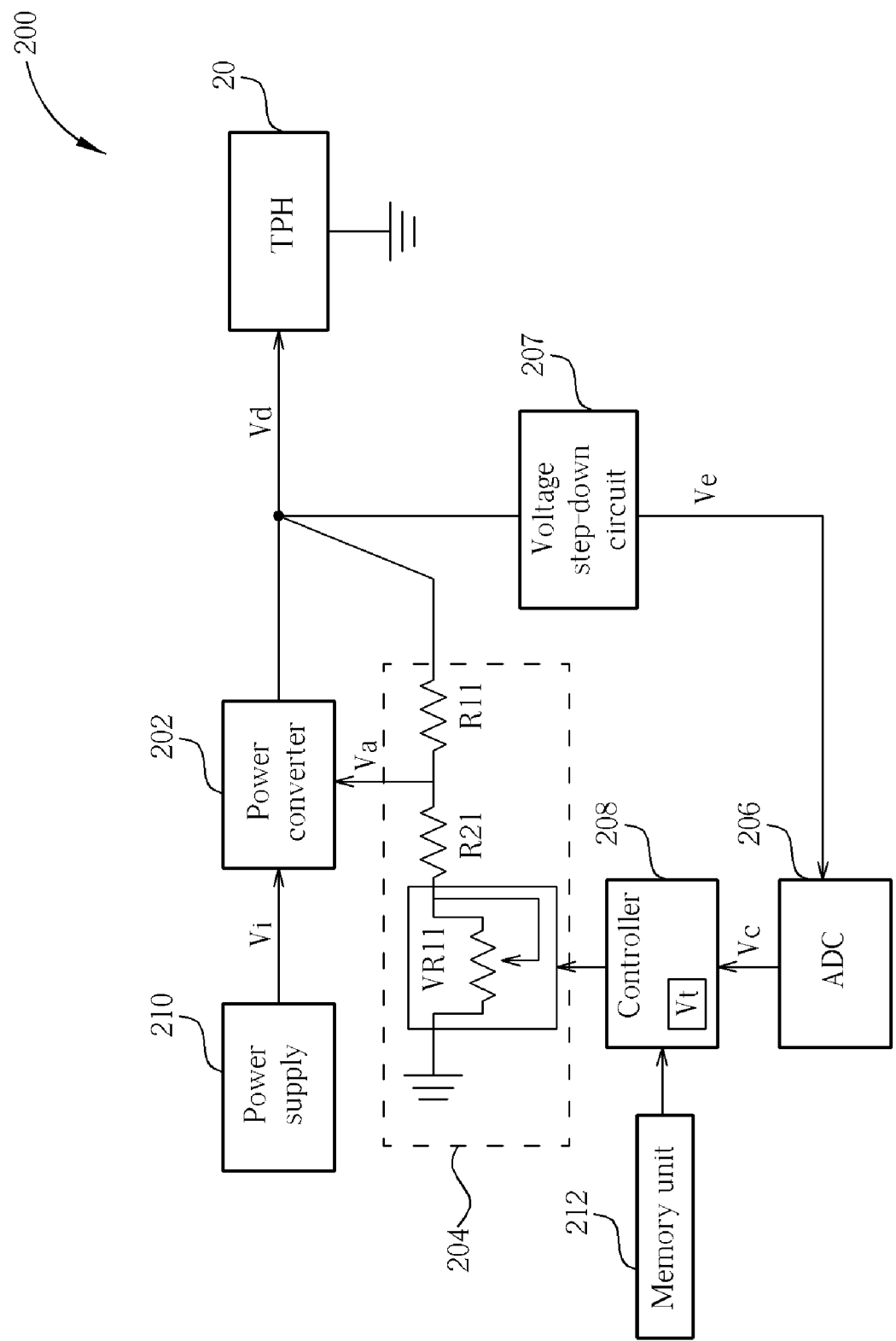
FIG. 2 shows a simplified block diagram of a voltage adjusting system for adjusting a driving voltage of a TPH according to an embodiment of the present invention.

Please refer to FIG. 2. FIG. 2 shows a simplified block diagram of a voltage adjusting system 200 for adjusting a driving voltage of a TPH according to an embodiment of the present invention. As shown in FIG. 2, the voltage adjusting system 200 for adjusting a driving voltage of a TPH 20 includes a power converter 202, a voltage divider 204, an analog-to-digital converter (ADC) 206, a voltage step-down circuit 207, and a controller 208. The power converter 202 is coupled to a power supply 210, wherein the power converter 202 can be a DC-to-DC power converter, however, this is not a limitation of the present invention.

In the present invention, the power converter 202 is utilized for converting the supply voltage Vi to the driving voltage Vd according to a feedback voltage Va. The voltage divider 204 is coupled to the power converter 202, and utilized for generating the feedback voltage Va according to the driving voltage Vd. The voltage divider 204 includes a first resistor R11, a second resistor R21, and an electronic variable resistor VR11. Please note that the number of the resistors and the position of the electronic variable resistor VR11 in the voltage divider 204 in this embodiment are only for illustrative purposes, and are not limitations of the present invention. For example, the voltage divider 204 can also just include the first resistor R11 and the electronic variable resistor VR11, or the position of the electronic variable resistor VR11 can be coupled in series to the first resistor R11 instead of being coupled in series to the second resistor R21. Nevertheless, all of the above design variations fall within the scope of the present invention.

The voltage step-down circuit 207 is coupled between the power converter 202 and the ADC 206, and utilized for bringing the driving voltage Vd down to generate a detecting voltage Ve, wherein the ADC 206 converts the detecting voltage Ve to a detecting voltage value Vc. The voltage step-down circuit 207 can be implemented by utilizing a voltage divider or a subtractor. Please note that the voltage step-down circuit 207 is not an essential component in the present invention. If there is no requirement for the voltage step-down operation (for example, the voltage level of the driving voltage Vd is not very high or the allowed input voltage range of the ADC 206 is large enough), then the ADC 206 can be directly connected to the power converter 202 without utilizing the voltage step-down circuit 207 in the other embodiments of the present invention, and the purpose of outputting the detecting voltage value Vc of the driving voltage Vd can also be achieved.

The controller 208 is coupled to the ADC 206 and to the electronic variable resistor VR11, and utilized for controlling the electronic variable resistor VR11 according to the detecting voltage value Vc and a target voltage value Vt of the TPH 20. In addition, the voltage adjusting system 200 can further include a memory unit 212 for storing a resistance value of the TPH 20 in this embodiment, and the controller 208 determines the target voltage value Vt according to the resistance value of the TPH 20, wherein the memory unit 212 can be a flash memory, and can be externally connected to the controller 208 (as shown in FIG. 2) or embedded in the controller 208. Furthermore, the memory unit 212 can further store a firmware program, and the controller 208 executes the firmware program so as to determine the target voltage value Vt according to the resistance value of the TPH 20. In addition, the memory unit 212 can also further store a mapping table for the different resistance values and the required target voltage value of the TPH 20, and the controller 208 determines the target voltage value Vt according to the mapping table and the resistance value of the TPH. For example, the present invention method can first detect the resistance value of the TPH 20 during the manufacturing process of the TPH 20, and then store all of the resistance values of the TPH 20, the firmware program, and the mapping table into the flash memory via a data burn-in process.

Figure 3:
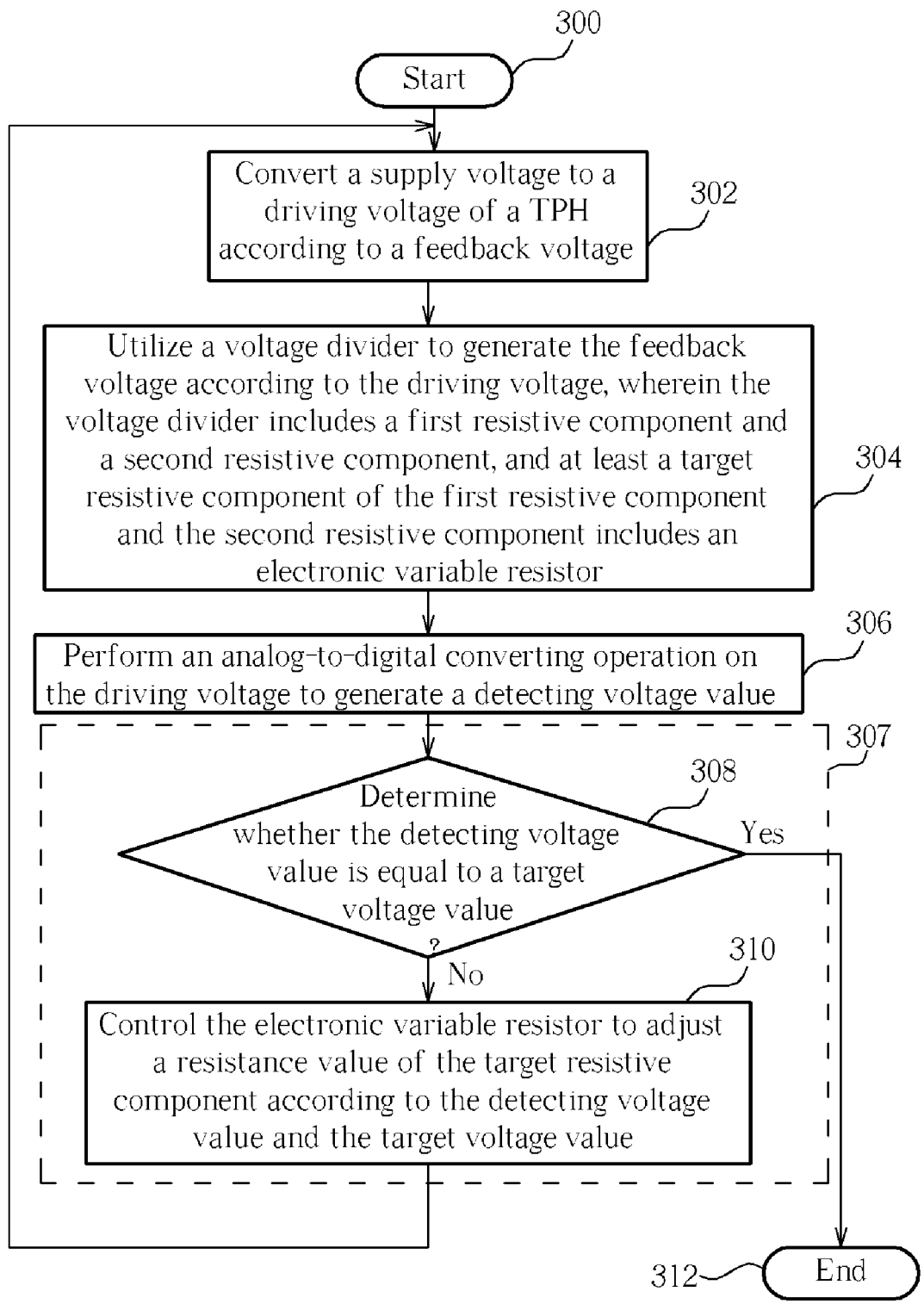
FIG. 3 is a flowchart showing an exemplary method for adjusting a driving voltage of a TPH according to an embodiment of the present invention.

Please refer to FIG. 3. FIG. 3 is a flowchart showing an exemplary method for adjusting the driving voltage of the TPH according to an embodiment of the present invention. The operation of adjusting the driving voltage of the TPH of the present invention is implemented with the voltage adjusting system 200 shown in FIG. 2, and the flow can be summarized concisely in the following steps:

Step 300: Start.

Step 302: Convert a supply voltage to a driving voltage of a TPH according to a feedback voltage.

Step 304: Utilize a voltage divider to generate the feedback voltage according to the driving voltage, wherein the voltage divider includes a first resistive component and a second resistive component, and at least a target resistive component of the first resistive component and the second resistive component includes an electronic variable resistor.

Step 306: Perform an analog-to-digital converting operation on the driving voltage to generate a detecting voltage value.

Step 308: Determine whether the detecting voltage value is equal to a target voltage value. If the detecting voltage value is equal to the target voltage value, then go to step 312; otherwise, perform step 310.

Step 310: Control the electronic variable resistor to adjust a resistance value of the target resistive component according to the detecting voltage value and the target voltage value, and then go back to step 302.

Step 312: End.

Figure 4:
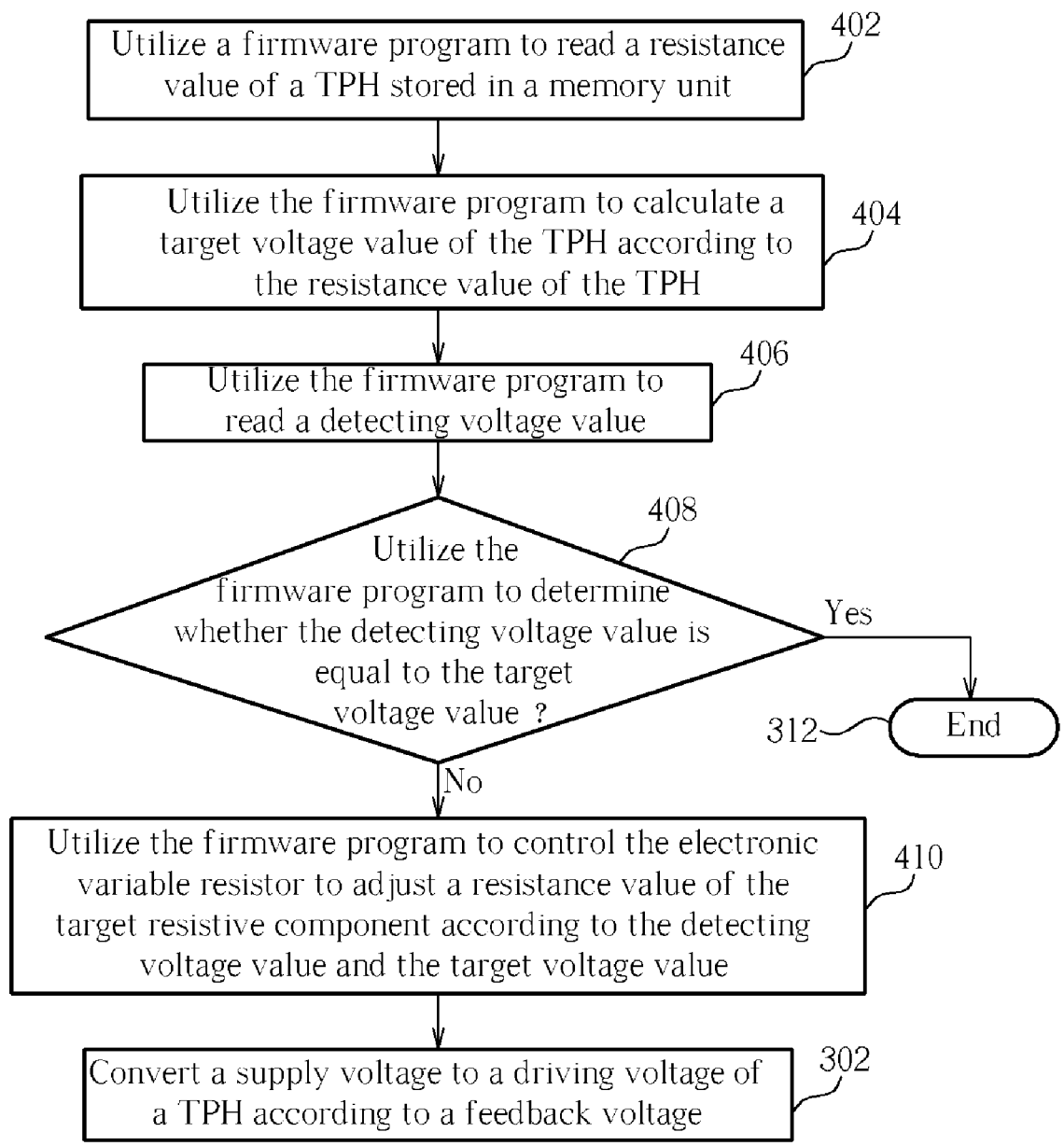
FIG. 4 is a flowchart of step 307 shown in FIG. 3 performed by utilizing a firmware program.

Please refer to FIG. 4. FIG. 4 is a flowchart of the operation of step 307 shown in FIG. 3 performed by utilizing a firmware program. The operation flow of utilizing the firmware program to perform the step 307 shown in FIG. 3 can be summarized concisely in the following steps:

Step 400: Start.

Step 402: Utilize a firmware program to read a resistance value of a TPH stored in a memory unit.

Step 404: Utilize the firmware program to calculate a target voltage value of the TPH according to the resistance value of the TPH.

Step 406: Utilize the firmware program to read a detecting voltage value.

Step 408: Utilize the firmware program to determine whether the detecting voltage value is equal to the target voltage value. If the detecting voltage value is equal to the target voltage value, then go to step 312 in FIG. 3; otherwise, perform step 410.

Step 410: Utilize the firmware program to control the electronic variable resistor to adjust a resistance value of the target resistive component according to the detecting voltage value and the target voltage value, and then go back to step 302 in FIG. 3.

Briefly summarized, the voltage adjusting system 200 of the present invention is able to utilize the control schemes of the hardware of the firmware to automatically set the target voltage value Vt of the TPH 20 according to the resistance value of the TPH 20, and adjust the driving voltage Vd to attain the target voltage value Vt. Therefore, the present invention is capable of reducing errors due to adjustments done by hand, increasing the stability of the printing quality of the thermal sublimation (or thermal transfer) printers, and further improving the efficiency in the production line. In addition, the voltage adjusting system 200 of the present invention has an advantage of scheme simplification, and therefore the cost can be reduced significantly.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A voltage adjusting system for adjusting a driving voltage of a thermal print head (TPH), the voltage adjusting system comprising:
   a power converter, coupled to a supply voltage, for converting the supply voltage to the driving voltage according to a feedback voltage;
   a voltage divider, coupled to the power converter, for generating the feedback voltage according to the driving voltage, the voltage divider comprising a first resistive component and a second resistive component, wherein at least a target resistive component of the first resistive component and the second resistive component comprises an electronic variable resistor;
   an analog-to-digital converter (ADC), coupled to the power converter, for generating a detecting voltage value according to the driving voltage; and
   a controller, coupled to the ADC and the electronic variable resistor, for controlling the electronic variable resistor to adjust a resistance value of the target resistive component according to the detecting voltage value and a target voltage value.

2. The voltage adjusting system of claim 1, further comprising:
   a memory unit, coupled to the controller, for storing a resistance value of the TPH;
   wherein the controller determines the target voltage value according to the resistance value of the TPH.

3. The voltage adjusting system of claim 2, wherein the memory unit further stores a firmware program, and the controller executes the firmware program to determine the target voltage value according to the resistance value of the TPH.

4. The voltage adjusting system of claim 2, wherein the memory unit further stores a mapping table, and the controller determines the target voltage value according to the mapping table and the resistance value of the TPH.

5. The voltage adjusting system of claim 1, further comprising:
   a voltage step-down circuit, coupled between the power converter and the ADC, for lowering the driving voltage to generate a detecting voltage;
   wherein the ADC converts the detecting voltage to the detecting voltage value.

6. The voltage adjusting system of claim 5, wherein the voltage step-down circuit comprises a voltage divider or a subtractor.

7. A voltage adjusting system, comprising:
   a power converter, coupled to a supply voltage, for converting the supply voltage to an output voltage according to a feedback voltage;
   a voltage divider, coupled to the power converter, for generating the feedback voltage according to the output voltage, the voltage divider comprising a first resistive component and a second resistive component, wherein at least a target resistive component of the first resistive component and the second resistive component comprises an electronic variable resistor;
   an analog-to-digital converter (ADC), coupled to the power converter, for generating a detecting voltage value according to the output voltage; and
   a controller, coupled to the ADC and the electronic variable resistor, for controlling the electronic variable resistor to adjust a resistance value of the target resistive component according to the detecting voltage value and a target voltage value.

8. The voltage adjusting system of claim 7, further comprising:
   a voltage step-down circuit, coupled between the power converter and the ADC, for lowering the output voltage to generate a detecting voltage;
   wherein the ADC converts the detecting voltage to the detecting voltage value.

9. A method for adjusting a driving voltage of a TPH, the method comprising:
   converting a supply voltage to the driving voltage according to a feedback voltage;
   utilizing a voltage divider to generate the feedback voltage according to the driving voltage, the voltage divider comprising a first resistive component and a second resistive component, wherein at least a target resistive component of the first resistive component and the second resistive component comprises an electronic variable resistor;
   performing an analog-to-digital converting operation on the driving voltage to generate a detecting voltage value of the target resistive component; and
   controlling the electronic variable resistor to adjust a resistance value thereof according to the detecting voltage value and a target voltage value.

* * * * *